US006832575B2

(12) United States Patent
Carroll, Jr.

(10) Patent No.: US 6,832,575 B2
(45) Date of Patent: Dec. 21, 2004

(54) POINT DRIVE STAKE SYSTEM

(76) Inventor: Willard D. Carroll, Jr., 1834 Delwood Dr., Abilene, TX (US) 79603

( * ) Notice: Subject to any disclaimer, the term of this patent is extended or adjusted under 35 U.S.C. 154(b) by 0 days.

(21) Appl. No.: 10/417,701

(22) Filed: Apr. 17, 2003

(65) Prior Publication Data

US 2004/0206293 A1 Oct. 21, 2004

(51) Int. Cl.[7] ............................................. G09F 17/00
(52) U.S. Cl. ...................... 116/209; 403/275; 403/278; 403/282
(58) Field of Search ................................ 116/200, 209, 116/173; 404/9, 10; 473/150; 173/90, 91; 52/103, 104; 403/206, 209, 215, 275, 278, 282, 285, 392; 15/190, 195

(56) References Cited

U.S. PATENT DOCUMENTS

| | | | | | |
|---|---|---|---|---|---|
| 788,714 | A | * | 5/1905 | Flemming | 15/190 |
| 1,879,103 | A | * | 9/1932 | Connor | 15/190 |
| 3,205,626 | A | * | 9/1965 | Attenberger | 52/103 |
| 3,267,901 | A | * | 8/1966 | Carroll | 116/209 |
| 3,277,510 | A | * | 10/1966 | Peloquin | 15/190 |
| 3,378,967 | A | * | 4/1968 | Baumeister | 52/98 |
| 3,516,171 | A | * | 6/1970 | Martin | 33/293 |
| 3,823,785 | A | * | 7/1974 | Toliver | 173/90 |
| 3,903,835 | A | | 9/1975 | Carroll | 248/219.2 |
| 3,916,821 | A | * | 11/1975 | Pies | 52/103 |
| 4,738,060 | A | * | 4/1988 | Marthaler et al. | 52/103 |
| 4,813,494 | A | * | 3/1989 | Beard et al. | 173/91 |
| 4,852,512 | A | * | 8/1989 | Klatt | 116/209 |
| 4,893,455 | A | | 1/1990 | Hughes | 56/1 |
| 5,003,735 | A | | 4/1991 | Bates | 52/105 |
| 5,165,663 | A | * | 11/1992 | Wells | 256/19 |
| 5,174,237 | A | | 12/1992 | Beard | 116/209 |
| 5,215,033 | A | | 6/1993 | Gipp et al. | 116/209 |
| 5,449,253 | A | * | 9/1995 | Roger | 405/245 |
| 5,501,170 | A | * | 3/1996 | Walsh | 116/209 |
| 5,524,855 | A | * | 6/1996 | Lesar | 248/530 |
| 5,881,495 | A | * | 3/1999 | Clark | 47/48.5 |
| 6,095,081 | A | * | 8/2000 | Gochenour | 116/209 |
| 6,142,882 | A | | 11/2000 | Anglea | 473/150 |
| 6,474,198 | B2 | * | 11/2002 | Lowther | 81/27 |
| 6,481,364 | B2 | * | 11/2002 | Woyjeck | 114/294 |
| 2003/0089833 | A1 | * | 5/2003 | Hsu | 248/532 |

* cited by examiner

Primary Examiner—G. Bradley Bennett
Assistant Examiner—R. Alexander Smith
(74) Attorney, Agent, or Firm—Charles D. Gunter, Jr.

(57) ABSTRACT

A stake can be driven into a surrounding terrain using a point drive system. The stake body is formed of a durable material such as plastic with a pointed bottom end and a top end which can carry a bundle of colored filaments. The stake body has a hollow interior bore extending from a top end opening downwardly to a bottom end in the vicinity of the pointed bottom end of the stake. The hollow interior bore allows the stake to be driven into a surrounding terrain by an extended tool which is received within the interior bore in point drive fashioin.

9 Claims, 3 Drawing Sheets

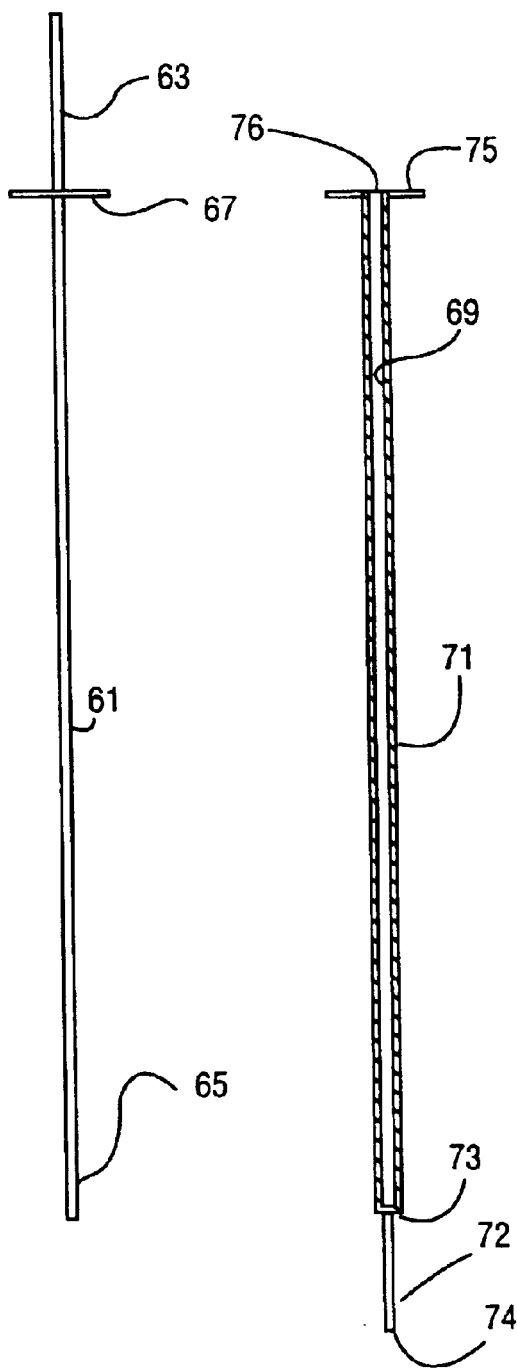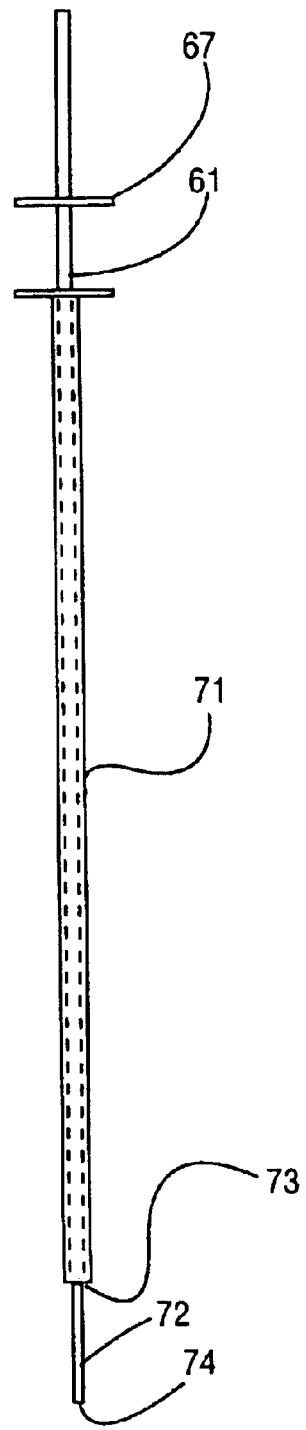
FIG. 7　　　FIG. 8　　　FIG. 9

POINT DRIVE STAKE SYSTEM

BACKGROUND ART

1. Field of the Invention

The invention relates to stakes adapted to be driven into a surrounding terrain and, more specifically, to a marker stake such as is used in construction work such as road building.

2. Description of Related Art

The advantages of the stakes of the invention can perhaps be best understood with reference to one prior art field of use, namely as a grading or marker stake. Grading stakes are one type of marker device commonly used in a variety of building and construction industries. Grading stakes are used to indicate the level to which the surrounding terrain must be graded. The stakes are customarily driven to a specified level relative to the existing surface and frequently include a brightly painted top to indicate the existence of the stake top and the level to which the surface ground is to be cut or filled. Other typical uses in the construction industries include topographic surveys of the site to be used in the preparation of plans for a structure and locating in the soil a system of stakes or other markers both in plan and in elevation from which the construction crew can take measurements of earthwork and other measurements for the proper construction of structures. Additionally, temporary stakes or other markers are usually set at the corners of proposed structures, as an approximate guide for beginning the excavation.

Although the top of grading stakes may be initially visible, for example, when the stake top is above the existing ground or is set in a small hand-dug hole, the stakes are frequently covered during the passes of the grader. To improve the visibility of the grading stake, a flag comprising a bundle of brightly colored, polymer filaments is attached to the top end of the stake. In this manner, the colored flag or whiskers will first appear before the top of the stake is reached.

U.S. Pat. No. 3,903,835, entitled GRADE INDICATOR STAKE FLAG HOLDER, issued 9 Sep. 1975, and assigned to the assignee of the present invention shows a marker stake in which the flag or filament bundle is folded at the center and retained by a metal crimp band. The band includes a staple device for attaching the banded filaments to the top of a wooden stake by driving the staple device into the top of the stake.

U.S. Pat. No. 5,501,170, entitled "Grading Stake With Indicator Flag", issued Mar. 26, 1996, to Walsh, purports to avoid the various problems of utilizing an indicator flag that is attached to a wooden grading stake by an attachment means that penetrates the stake. In the Walsh reference, a bundle of colored filaments are fastened at one end to the top end of the stake member by a tape wrap which is wound around the end of the bundle of colored filaments and the top end of the stake member.

U.S. Pat. No. 5,174,237, entitled "Grade Marker", issued Dec. 29, 1992, to Beard shows a grade marker in which the location of the stake is found by the feather that is held by a clip which is driven into the side of the stake.

Despite improvements made in marker stakes of the above type, certain problems continue to exist. The setting of prior art wooden stakes has been time consuming and tiresome in that workers were required to bend over to insert the stakes into the ground. Also, the methods used to drive the stakes into a surrounding terrain were often less than satisfactory. Pounding the top of a wooden stake with a hammer or like tool often caused the stake to split. Also, it was difficult or impossible to drive certain of the prior art stakes into difficult terrains such as rocky ground.

A need exists for a more ergonomic system for installing stakes which is less labor intensive and which is simple in design and operation.

A need exists for an improved marker stake which more securely attaches the filaments of a colored whisker flag to the stake.

A need also exists for a stake adapted to be driven into a surrounding terrain which is made of a synthetic polymeric material which is more durable than existing wooden stake designs.

A need also exists for such a stake which includes a point drive system to facilitate installing the stake in a surrounding terrain by using a simple hand tool as a driver.

BRIEF SUMMARY OF THE INVENTION

The improved stake of the invention includes a stake body which is formed of a durable, light weight material such as a synthetic, polymeric material. The stake body has a bottom pointed end, an intermediate sidewall portion and a top end which terminates in a planar exposed end surface. The stake body has a hollow interior bore which terminates in an end opening in the top end thereof, the interior bore being sized to receive a driving tool for driving the marker stake into the ground. The hollow interior bore terminates in a closed bottom end which is arranged oppositely to the top end opening. The distance between the top end opening and the closed bottom end extends for a predetermined length which places the bottom end in the vacinity of the bottom pointed end of the stake. In this way, the hollow interior extends for more than 50% of the overall length of the stake body and preferably more than about 75% of the overall length of the body. In one embodiment, a filament bundle of stiff, resilient strands form an indicator flag and are attached to the top, planar exposed end surface of the stake body.

In one embodiment of the marker stake version of the invention, the stake body has a cylindrical sidewall portion which is joined to the top end by a frusto-conical wall region. The top, planar exposed end surface has an outer periphery, the outer periphery being of a larger relative diameter than the diameter of the cylindrical sidewall portion of the stake body. In some cases, two filament bundles are attached to the top, planar exposed end surface of the stake body, one of the filament bundles extending upwardly from the exposed end surface to a greater relative height than the other of the filament bundles. The filament bundles can also be colored differently.

In the case of a marker stake, an attachment means is used for attaching the filament bundle to a recess provided in the exposed end surface of the stake body. The preferred attachment means comprises a metal strip which overlays a mid region of the filament bundle when the bundle is received across the recess in the top surface, whereby bending the metal strip by forcing it into the recess on top of the filament strands serves to retain the filament bundle within the recess provided in the top surface of the stake body.

The stake of the invention, with its point drive system, can be driven into the surrounding terrain by using a simple tool comprised of a solid bar carried within a surrounding tube. The surrounding tube terminates in an exposed end region which is sized to be received within and temporarily engaged within the hollow interior bore of the stake body.
}

The solid bar is, in turn, received within the hollow interior of the surrounding tube. Opposite relative movement between the solid bar and the hollow tube serves to exert a downward driving force within the hollow interior bore of the stake body to drive the stake body into the surrounding terrain.

The above as well as additional objects, features, and advantages of the invention will become apparent in the following detailed description.

BRIEF DESCRIPTION OF THE DRAWINGS

FIG. 7 is an isolated, perspective view of the solid bar component of the installation tool of the invention.

FIG. 8 is an isolated perspective view of the hollow tube component of the installation tool of the invention.

FIG. 9 is a simplified view of the assembled installation tool, the dotted lines being used to represent the relative movement between the solid bar and hollow tube.

DETAILED DESCRIPTION OF THE PREFERRED EMBODIMENT

Figure 6:
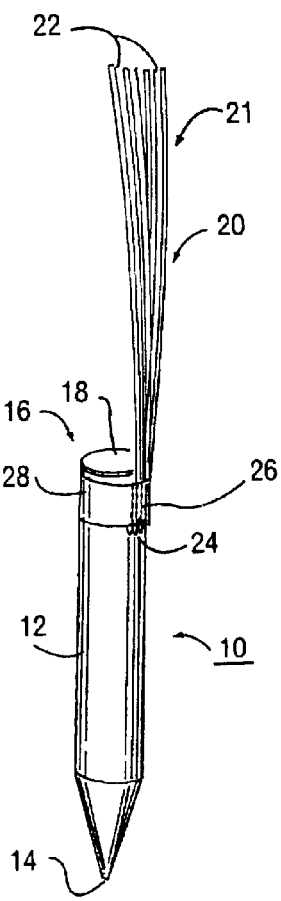
FIG. 6 is a perspective view of a prior art wooden marker stake.

In order to explain the advantages of the present invention, reference will first be made to the prior art wooden stakes commonly used in the industry. While the invention will be described with respect to a preferred embodiment as a marker stake, those skilled in the art will understand that the stakes of the invention can be used in a variety of applications such as tent stakes, as trail or backpack marking devices, as markers for sports fields, as roadside markers, etc. FIG. 6 of the drawings shows a prior art grading stake with indicator flag, designated generally as 10. The grading stake comprises a wooden stake member, shown here as a dowel 12 having a conically turned, pointed end 14 to enable the stake 10 to be easily driven into the ground. A top end 16 of the stake includes a flat top 18 that may be brightly colored to indicate the grade level that the ground is to be cut or filled by conventional grading equipment. Connected to the top end 16 of the stake 10 is a flag 20 that is comprised of a bundle of polymer, monofilaments 21 that are brightly colored to signal the location of the stake 10.

The filament bundle 21 is constructed with a plurality of individual filaments 22 having a looped end 24 that is crimped and held by a ⅜" tape band 26 to form the flag 20. The looped end of the filament bundle 21 is attached to the top end 16 of the stake member 12 by a 1" tape wrap 28 formed of a high strength, filament-impregnated, packing tape. The tape wrap 28 is wound a multiple number of turns around the top end 16 of the stake member 12 and the crimped end 24 of the filament bundle 21.

The filament bundle used in the marker stake shown in FIG. 6 could be fairly easily dislodged since it was merely taped into position. In the case of wooden stakes having nailed on filament bundle, extra care was required to avoid splitting the wood during installation. Also, the solid wooden stake did not provide access for any type of installation device which would obviate the need for a user to bend from the waist when installing the stake. The solid wooden stakes did not include a "point drive" system to facilitate driving the stake into hard terrain such as rocky ground.

Figures 1, 2:
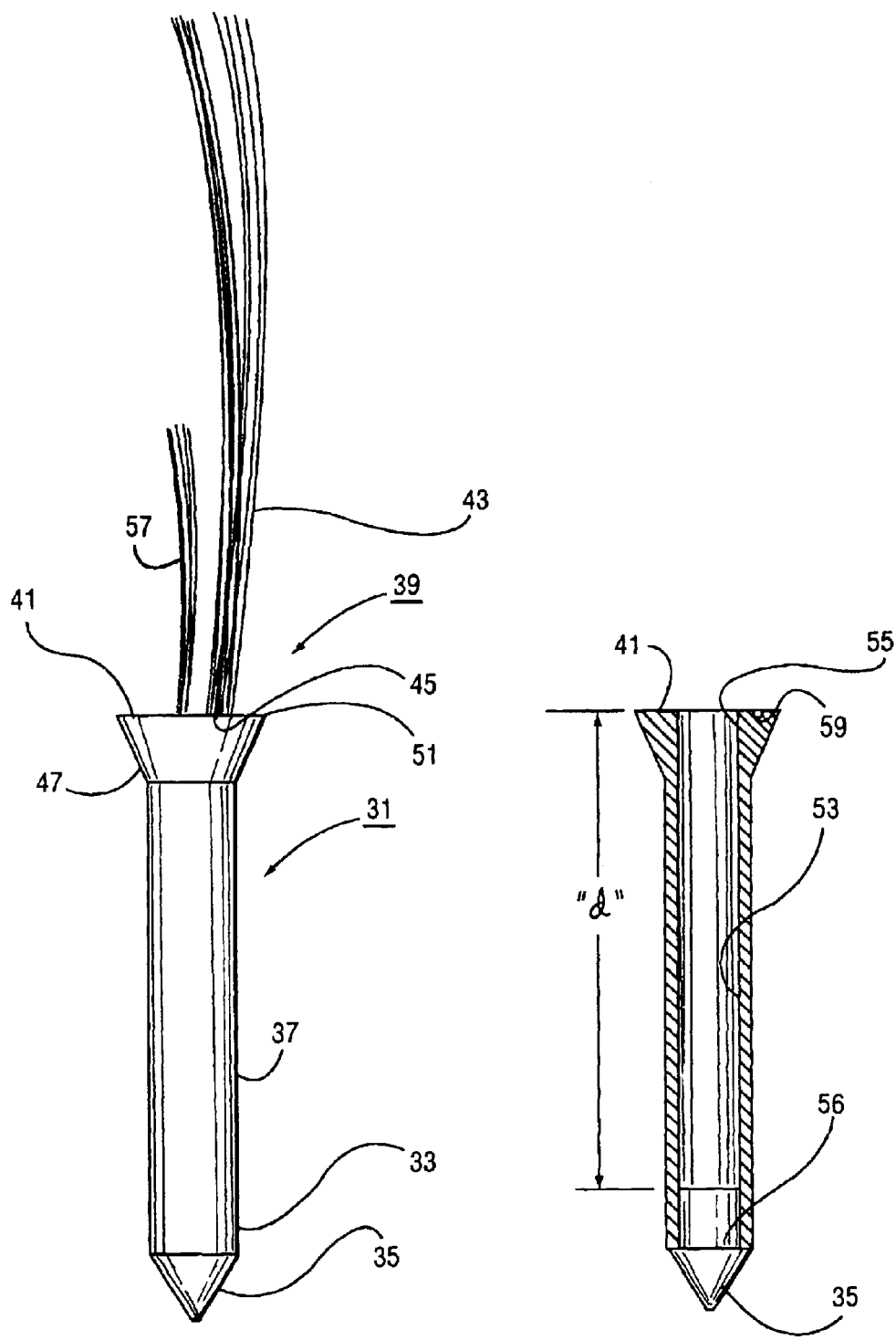
FIG. 1 is a side elevational view of one embodiment of the marker stake of the invention.
FIG. 2 is a side, sectional view of the marker stake of FIG. 1.

FIG. 1 shows a marker stake of the invention, designated generally as 31. The stake body 33 is preferably formed of a synthetic, polymeric material such as polypropylene, high density polyethylene, ABS or other suitable plastic which can be injection molded. However, other durable, light weight materials might also be utilized in some applications such as aluminum or other light weight metals or metal alloys. The stake body 33 has a bottom pointed end 35, and intermediate cylindrical sidewall portion 37 and a top end 39 which terminates in a planar exposed end surface 41. While the bottom pointed end 35 can be integrally molded as a part of the plastic body, it can also be a hardened insert, such as a steel tip or tip formed of PVC or other hardened material. A filament bundle of stiff, resilient strands 43 are attached to the top planar surface 41 to form an indicator flag. The filament bundle has an attachment end 45 which is attached to the top, planar exposed end surface 41 of the stake body. Preferably, the cylindrical sidewall portion 37 of the stake body is joined to the top end surface 41 by a frusto-conical wall region 47. As shown in FIG. 1, the top planar exposed end surface 41 has an outer periphery 51. The outer periphery 51 is of a larger relative diameter than the diameter of the cylindrical sidewall portion 37 of the stake body forming a flared end opposite the pointed 35. While the marker stake illustrated in FIG. 1 can be provided with only a single filament bundle 43, it will be understood that one or more additional bundles could be provided as well of a different relative height or color or texture.

As shown in FIG. 2, the synthetic polymeric material of the stake body is preferably provided with a hollow interior bore 53 which terminates in an end opening 55 in the top end surface 41. The interior bore 53 is sized to receive a driving tool or implement for driving the marker stake into a surrounding terrain. The hollow interior bore terminates in a closed bottom end 56 which is arranged oppositely to the top end opening 55. The distance ("d" in FIG. 2) between the top end opening 55 and the closed bottom end 56 extends for a predetermined length which places the bottom end 56 in the vicinity of the bottom pointed end 35 of the stake. In this way, the hollow interior extends for more than 50% of the overall length of the stake body and preferably more than about 75% of the overall length of the body. In the particular embodiment illustrated in FIG. 2, the distance "d" extends for approximately 80% of the overall length of the stake body.

The hollow bore 53 forms a "point drive" system for the stake of the invention. A suitable driving tool can be inserted within the bore 53 until a lower extent of the driver contacts the bottom end 56 of the hollow bore. If the driver is closely received within the bore 53, then the stake can be lowered into position without the necessity of the user bending at the waist. Perhaps more importantly, the durable material of the stake, as well as the hollow bore and location of the bottom end 56, provide a concentrated driving force on the stake which allows it to be driven into difficult terrains which would otherwise tend to bend or break other driving systems.

Figure 3:
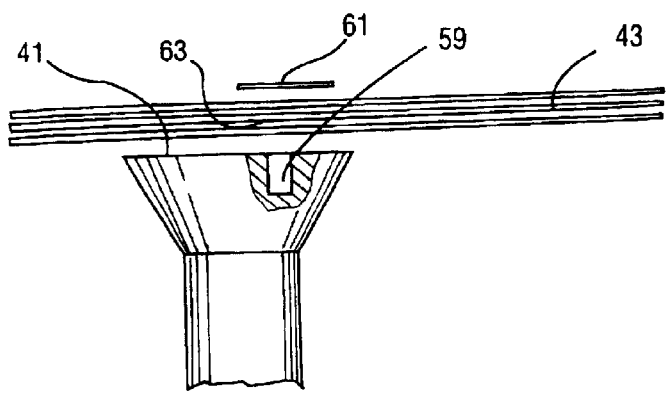
FIG. 3 is a partial sectional end view of the marker stake of the invention, showing the first step in installing the filament bundle on the top end of the stake.
Figure 4:
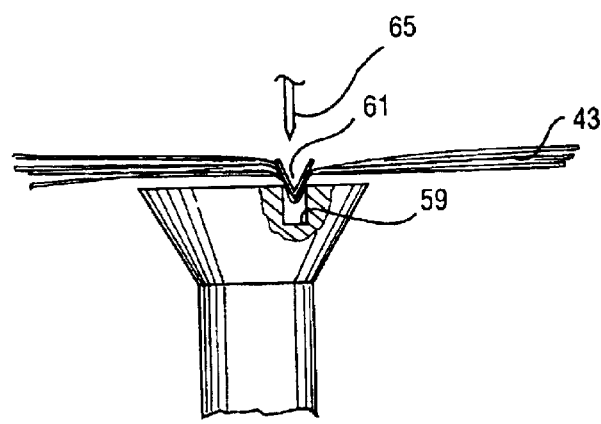
FIG. 4 is a view similar to FIG. 3 showing the next step in the installation of the filament bundle.
Figure 5:
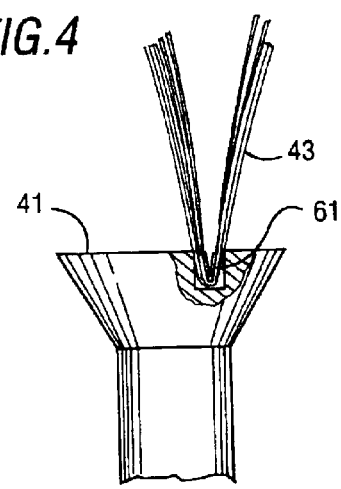
FIG. 5 is a view similar to FIG. 4 showing the last step in the installation process.

FIGS. 3–5 illustrate the improved method for attaching the filament bundle 43 to the marker stake of the invention.

A recess 59 is provided in the top end of the stake body. An attachment ends is provided for attaching the filament bundle within the recess 59. In the preferred form, the attachment means can comprise a metal strip or wire 61 which is initially flat or unbent. The metal strip 61 initially overlays a mid-region 63 of the filament bundle 43 when the bundle is received across the recess 59 in the top surface 41 if the stake. As shown in FIG. 4, a simple hand tool, such as the pointed driver 65 can then be used to bend the metal strips 61 by forcing it into the recessed 59 in the top surface 41. This action serves to retain the filament bundle 43 within the recess 59 since the bent strip 61 engages the sidewalls of the recess 59.

Since the body of the marker stake of the invention is provided with a hollow bore, it is possible to use any number of installation tools or devices to install the stake without requiring the user to bend at the waist. It is also possible to use common objects such as a simple sixty penny nail or 3⅛ inch spike provided with a blunted end which is conveniently received within the bore 53 and which can be driven with a hammer or other tool to install the marker stakes in rough terrain.

FIGS. 7–9 illustrate a simple installation tool which can be utilized with the marker stake of the invention. The installation tool illustrated in FIG. 7-9 includes a solid bar 61 having an upper end 63 and a lower end 65. The bar also has a flange 67 located proximate the upper end 63. The solid bar 61 is received within the open interior 69 of a hollow tube 71 (FIG. 8). The hollow tube 71 has a lower extent 72 which terminates in an exposed tip 74. An end flange 75 is located opposite the tip 74 proximate end opening 76.

As shown in FIG. 9, the solid bar 61 can be installed within the hollow tube 71 with the lower end 65 contacting the lower extent 72. The tip 74 would be engaged within the hollow bore 53 (FIG. 2) of the stake of the invention temporarily securing the stake to the tip 74. The solid bar 61 is then driven back and forth in reciprocal fashion in the hollow tube 71 (as indicated by the dotted lines in FIG. 9). This reciprocal motion causes the lower end 65 of the solid bar to contact the lower extent 72 of the hollow tube, thereby acting as a point drive to urge the tip 74 downwardly. This action, in turn, causes the tip 74 to act as a point drive within the hollow bore 53 of the stake 31. Once the stake has been driven into the terrain, the installation tool can be disengaged by a simple upward pull, allowing the installation tool to be removed. This action separates the installation device from the hollow bore 53 of the stake, leaving the stake in place within the terrain.

An invention has been provided with several advantages. The marker stakes of the invention are formed of durable, lightweight materials, such as synthetic, polymeric materials which are extremely sturdy and resistant to environmental attack. The attachment means of the invention securely engages the filament bundle to the top surface of the stake so that the bundle is practically impossible to accidentally dislodge. The hollow interior of the stake body allows a variety of installation instruments to be utilized with the stake which allow a user to install without repeatedly bending from the waist. The point drive system allows the stake to be installed in terrains which would have been difficult or impossible to access with the prior art devices. The polymeric components of the stake of the invention allow the stake to be provided in a variety of colors and textures including the use of multi filament bundles of different heights and colors. The bottom end of the stake can be provided with a steel or hardened tip in order to penetrate extremely difficult terrains.

While the invention is shown in only one of its forms, it is not just limited but is susceptible to various changes and modifications without departing from the spirit thereof.

I claim:

1. A marker stake having an indicator flag, comprising:
    a stake body formed in one piece of a synthetic, polymeric material, the stake body having a bottom pointed end integrally formed of the synthetic, polymeric material, an intermediate cylindrical sidewall portion and a top end which terminates in a planar exposed end surface;
    a first filament bundle of stiff, resilient strands which form an indicator flag, the first filament bundle having an attachment region which is permanently attached to the top, planar exposed end surface of the stake body;
    wherein the stake body has a hollow interior bore which terminates in an end opening in the top end thereof, the interior bore being sized to receive a driving tool for driving the marker stake into the ground; and
    wherein the cylindrical sidewall portion of the stake body is joined to the top end by a frusto-conical wall region and wherein the top, planar exposed end surface has an outer periphery which slopes evenly downward to the cylindrical sidewall portion of the stake body, the outer periphery being of a larger relative diameter than the diameter of the cylindrical sidewall portion of the stake body.

2. The marker stake of claim 1, further comprising an additional filament bundle attached to the top, planar exposed end surface of the stake body, a selected one of the first and additional filament bundles extending upwardly from the exposed end surface to a greater relative height than the other of the filament bundles.

3. The marker stake of claim 2, wherein the filament bundles are colored differently.

4. The marker stake of claim 1, further comprising:
    an attachment means for attaching the filament bundle to a recess provided in the exposed end surface of the stake body, the attachment means comprising a metal strip which overlays the attachment region of the filament bundle when the bundle is received across the recess in the top surface, whereby bending the metal strip by forcing it into the recess on top of the filament strands serves to retain the filament bundle within the recess provided in the top surface of the stake body.

5. A method of attaching an indicator flag to a stake body formed of a synthetic, polymeric material, the stake body having a bottom pointed end, an intermediate cylindrical sidewall portion and a top end which terminates in a planar exposed end surface having at least one recess formed therein, the method comprising the steps of:
    providing a filament bundle of stiff, resilient strands which form an indicator flag, the filament bundle having an attachment region which is attached to the top, planar exposed end surface of the stake body; and
    providing an attachment means for attaching the filament bundle to said recess provided in the exposed end surface of the stake body, the attachment means comprising a metal strip which overlays the attachment region of the filament bundle when the bundle is received across the recess in the top surface;
    forcing the metal strip into the recess on top of the mid region of the filament strands, whereby the filament strands are doubled into a U-shape, the metal strip being bent to fit within the recess to retain the attachment region of the filaments within the recess.

6. The method of claim 5, wherein the cylindrical sidewall portion of the stake body is joined to the top end by a frusto-conical wall region and wherein the top, planar exposed end surface has an outer periphery, the outer periphery being of a larger relative diameter than the diameter of the cylindrical sidewall portion of the stake body.

7. The method of claim 5, wherein the pointed end of the stake body comprises a steel insert which is molded within the synthetic, polymeric material of the stake body.

8. The method of claim 5, further comprising an additional filament bundle attached to the top, planar exposed end surface of the stake body, a selected one of the first and additional filament bundles extending upwardly from the exposed end surface to a greater relative height than the other of the filament bundles.

9. The method of claim 8, wherein the filament bundles are colored differently.

\* \* \* \* \*